Patented Feb. 19, 1952

2,585,903

UNITED STATES PATENT OFFICE 2,585,903

GELATIN CAPSULES CONTAINING CHLORAL HYDRATE

Arthur E. Meyer, Flushing, N. Y., assignor to Fellows Medical Manufacturing Company, Inc., New York, N. Y., a corporation of New York No Drawing. Application June 16, 1950, Serial No. 168,653

5 Claims. (Cl. 167—52)

This invention relates to gelatin capsules containing chloral hydrate.

An object of this invention is to administer for medicinal purposes chloral hydrate effectively and easily at an accurate dosage in a preparation suitable to be stored for an indefinite time.

Chloral hydrate is one of the oldest and most innocuous hypnotics. Although it has a great margin of safety and other physiological advantages over the relatively more recently introduced barbiturates, chloral hydrate has lost much of its popularity in therapy as a hypnotic because of certain physicochemical qualities which it possesses. It is very hygroscopic, volatile and has an unpleasant taste and odor. In fact one authority warned that it should not be administered in the form of tablets or pills since these concentrated forms might materially damage the mucus membranes of the mouth. This condition results from the formation of a concentrated aqueous solution in the mouth. Moreover, such tablets or pills are unstable because of the volatility of the chloral hydrate. Heretofore, then, it was difficult to administer to the patient chloral hydrate in a concentrated form of definite dosage.

In accordance with this invention, chloral hydrate is provided in a form which is of definite effective dosage, which may be administered in a relatively concentrated form without discomfort to the patient, which does not lose its potency by evaporation, and which prevents the absorption of water by the chloral hydrate. The chloral hydrate of this invention is dissolved in a fixed fat which may contain up to ten per cent of lecithin in the fat, and the resulting solution is completely and hermetically sealed in a soft gelatin capsule. Although the soft gelatin contains a certain amount of moisture, the chloral hydrate, protected by the fatty medium, does not absorb the water. By fixed fat is meant water insoluble glyceridic esters of fatty acids. The fixed fat is desirably liquid at 40 to 50° C. The fixed fat may be of vegetable or animal origin, such as peanut oil, sesame oil, cottonseed oil, almond oil, sunflower seed oil, olive oil, corn oil, soft lard or chicken fat. Preferably the chloral hydrate is dissolved in the fat at a temperature of 40 to 50° C. The concentration of the chloral hydrate may vary over wide limits depending upon the dosage, although a concentration of 100 grams of chloral hydrate to 100 to 250 cc. of the fat has been found satisfactory for most purposes. While a ratio of 100 grams of chloral hydrate to 250 cc. of fat remains clear at room temperature, such concentration requires relatively large capsules to assure proper dosage. It is therefore more desirable to produce capsules containing a higher concentration of choral hydrate in the fixed fat. From the standpoint of providing capsules of convenient dosage, a concentration in the ratio of 100 grams of chloral hydrate to 200 cc. of fixed fat is considered optimal. A mixture of 100 grams of chloral hydrate to 100 cc. of fixed fat remains clear only at relatively high temperature approaching the melting point of the chloral hydrate; and such mixture, which has a volume of about 160 cc., tends to form crystals on cooling. If enough fixed fat is added to bring the volume to 200 cc., the resulting mixture may be cooled to room temperature without depositing crystals. Since the mixture may be placed into capsules while still warm and crystals possibly formed later within the fixed fat are still protected against the action of moisture by the surrounding oil, the use of the higher concentration remains practicable. It is essential, however, that if discrete crystals of chloral hydrate are contained in the fat, such crystals should be protected by a layer of fat to prevent the chloral hydrate from absorbing water.

The solution of chloral hydrate in the fat is poured into soft gelatin capsules and the capsules sealed completely and hermetically in any convenient manner by known methods. The soft gelatin capsule is produced by known methods from commercial gelatin solution containing gelatin, glycerine and water, the glycerine acting as a plasticizer of the gelatin. The capsules may be prepared in an especially constructed apparatus. At a temperature adjusted to keep the gelatin mixture semi-solid, sheets of gelatin are moved over a metal plate having holes of a suitable size. Punches press the gelatin into these holes producing depressed pockets of a determined size. These pockets are filled with measured quantities of the chloral hydrate-oil solution, whereupon a second sheet of gelatin is placed over the first one. Pressure is applied around the filled parts causing union between both sheets of gelatin and a hermetic seal around the medication. The formed capsule is subsequently stamped out from the double gelatin sheet.

The chloral hydrate contained in the soft gelatin capsule is substantially completed dehydrated. Ordinarily the chloral hydrate is supplied from the manufacturer in substantially dehydrated form and is shipped in substantially moisture-proof containers. Such substantially dehydrated chloral hydrate may be dissolved in the fixed fat, and the resulting solution employed for filling the gelatin capsules. If, however, the chloral hydrate, due to exposure to air, has absorbed any appreciable amount of moisture, such moisture forms droplets of water when the chloral hydrate is dissolved in the fat and such droplets are readily separated from the fat solution of chloral hydrate before such oil solution is poured into the capsules.

A more comprehensive understanding of this invention is obtained by reference to the following examples:

*Example 1.*—250 grams of substantially dehydrated chloral hydrate U. S. P. are dissolved at a temperature of 50° C. in 250 cc. of peanut oil and brought to a volume of 500 cc. with more peanut oil. This solution has a specific gravity of 1.14. It is filled into soft gelatin capsules so that each capsule contains 0.25 gram of chloral hydrate, and the capsules are completely sealed by known means.

An oil solution similar except in concentration of chloral hydrate to that prepared in accordance with Example 1 was tested pharmacologically as follows:

Rabbits of 6 lbs. weight were given by stomach tube a 30% aqueous chloral hydrate solution and another group 30% solution of chloral hydrate in peanut oil. The total dose was in each case 1 gram of chloral hydrate. The animals of both groups developed the usual signs of incoordination of movements within 15 minutes, proving that the chloral hydrate is absorbed from the solution in oil at an equal rate as from the aqueous vehicle.

*Example 2.*—Example 1 is repeated except that instead of using 250 cc. of peanut oil 250 cc. of cottonseed oil containing five per cent of cottonseed lecithin is employed.

The terms and expressions which I have employed are used as terms of description and not of limitation, and I have no intention, in the use of such terms and expressions, of excluding any equivalents of the features described or portions thereof, but recognize that various modifications are possible within the scope of the invention claimed.

What is claimed is:

1. An hermetically sealed soft gelatin capsule having completely sealed therein substantially dry chloral hydrate dissolved in a fixed fat.

2. An hermetically sealed soft gelatin capsule having completely sealed therein substantially dry chloral hydrate dissolved in a fixed fat in the proportions of 100 grams of chloral hydrate to 100 to 250 cc. of said fixed fat.

3. An hermetically sealed soft gelatin capsule having completely sealed therein substantially dry chloral hydrate dissolved in a vegetable glyceridic oil in the proportion of 100 grams of chloral hydrate to 100 to 250 cc. of said oil.

4. An hermetically sealed soft gelatin capsule having completely sealed therein substantially dry chloral hydrate dissolved in a fixed fat of animal origin in the proportion of 100 grams of chloral hydrate to 100 to 250 cc. of said fixed fat.

5. An hermetically sealed soft gelatin capsule having completely sealed therein substantially dry chloral hydrate dissolved in a vegetable glyceridic oil in the proportions of 100 grams of chloral hydrate to about 200 cc. of vegetable oil.

ARTHUR E. MEYER.

REFERENCES CITED

The following references are of record in the file of this patent:

UNITED STATES PATENTS

| Number | Name | Date |
|---|---|---|
| 2,298,122 | Hailer | Oct. 6, 1942 |

FOREIGN PATENTS

| Number | Country | Date |
|---|---|---|
| 20,116 | Great Britain | of 1889 |

OTHER REFERENCES

Goodman and Gilman, Pharmacological Basis of Therapeutics (1941), page 177.